United States Patent
Heng et al.

(10) Patent No.: US 9,726,002 B2
(45) Date of Patent: Aug. 8, 2017

(54) WATER TREATMENT IN AT LEAST ONE MEMBRANE FILTRATION UNIT FOR ENHANCED HYDROCARBON RECOVERY

(75) Inventors: Samuel Heng, Billere (FR); Pierre Pedenaud, Lescar (FR); Philippe Coffin, Lescar (FR)

(73) Assignee: Total S.A., Courbevoie (FR)

( * ) Notice: Subject to any disclaimer, the term of this patent is extended or adjusted under 35 U.S.C. 154(b) by 107 days.

(21) Appl. No.: 13/878,906

(22) PCT Filed: Oct. 11, 2011

(86) PCT No.: PCT/IB2011/054471
§ 371 (c)(1),
(2), (4) Date: Apr. 11, 2013

(87) PCT Pub. No.: WO2012/049619
PCT Pub. Date: Apr. 19, 2012

(65) Prior Publication Data
US 2013/0213649 A1    Aug. 22, 2013

(30) Foreign Application Priority Data
Oct. 14, 2010  (FR) ..................... 10 58369

(51) Int. Cl.
*B01D 61/00* (2006.01)
*C02F 1/44* (2006.01)
(Continued)

(52) U.S. Cl.
CPC ................ *E21B 43/34* (2013.01); *C02F 9/00* (2013.01); *C02F 1/38* (2013.01); *C02F 1/40* (2013.01);
(Continued)

(58) Field of Classification Search
CPC .............. B01D 2311/04; B01D 61/025; B01D 2311/06; B01D 61/022; B01D 61/04;
(Continued)

(56) References Cited

U.S. PATENT DOCUMENTS 4,176,057 A * 11/1979 Wheatley et al. ............ 210/637
4,663,932 A    5/1987 Cox
(Continued)

FOREIGN PATENT DOCUMENTS

FR           0959254 A    12/2009
WO      WO-9000922 A1    2/1990
(Continued)

*Primary Examiner* — Ana Fortuna
(74) *Attorney, Agent, or Firm* — Harness, Dickey & Pierce, PLC

(57) ABSTRACT

A water treatment method includes:
  withdrawing water from the environment;
  filtering the withdrawn water in a membrane filtration unit;
  extracting a production flow from an underground formation containing hydrocarbons;
  separating and collecting production water from the production flow;
  filtering the production flow in the membrane filtration unit;
  collecting a treated water flow from the membrane filtration unit. An installation adapted for applying this method is also provided.

12 Claims, 2 Drawing Sheets

(51) Int. Cl.
*E21B 43/34* (2006.01)
*C02F 9/00* (2006.01)
*B01D 63/00* (2006.01)
*B01D 39/00* (2006.01)
*C02F 1/38* (2006.01)
*C02F 1/40* (2006.01)
*C02F 101/32* (2006.01)
*C02F 103/36* (2006.01)

(52) U.S. Cl.
CPC .......... *C02F 1/444* (2013.01); *C02F 2101/32* (2013.01); *C02F 2103/365* (2013.01); *C02F 2201/008* (2013.01)

(58) Field of Classification Search
CPC .. B01D 61/027; B01D 2311/25; B01D 61/18; C02F 1/441; C02F 2103/08; C02F 1/442; C02F 2101/32
USPC ......... 210/652, 257.2, 195.2, 805, 639, 641; 166/77.51
See application file for complete search history.

(56) References Cited

U.S. PATENT DOCUMENTS

| | | | |
|---|---|---|---|
| 4,876,013 A | 10/1989 | Shmidt et al. | |
| 4,988,445 A * | 1/1991 | Fulk, Jr. | B01D 61/022 210/195.2 |
| 5,158,681 A * | 10/1992 | Freeman et al. | 210/641 |
| 5,238,574 A * | 8/1993 | Kawashima | C02F 1/441 210/195.2 |
| 5,501,798 A * | 3/1996 | Al-Samadi et al. | 210/652 |
| 5,603,983 A * | 2/1997 | Clough | C04B 35/62847 427/126.3 |
| 5,807,486 A * | 9/1998 | Busch, Jr. | 210/638 |
| 5,947,421 A | 9/1999 | Beattie et al. | |
| 6,193,194 B1 | 2/2001 | Minovitch | |
| 6,210,575 B1 | 4/2001 | Chase et al. | |
| 6,461,514 B1 * | 10/2002 | Al-Samadi | 210/652 |
| 6,508,936 B1 * | 1/2003 | Hassan | 210/652 |
| 7,494,610 B2 * | 2/2009 | Yeung et al. | 264/42 |
| 7,569,671 B2 | 8/2009 | Cheryan | |
| 7,591,304 B2 * | 9/2009 | Juhasz et al. | 166/77.51 |
| 8,741,143 B2 * | 6/2014 | Evans | B01D 61/022 210/605 |
| 2002/0189807 A1 | 12/2002 | Emanuele et al. | |
| 2004/0079706 A1 | 4/2004 | Mairal et al. | |
| 2006/0041216 A1 | 2/2006 | McLaughlin et al. | |
| 2006/0065598 A1 * | 3/2006 | Comstock | B01D 65/02 210/639 |
| 2007/0102359 A1 * | 5/2007 | Lombardi | B01D 17/085 210/639 |
| 2009/0050572 A1 | 2/2009 | McGuire et al. | |
| 2009/0056940 A1 | 3/2009 | Minnich et al. | |
| 2011/0005749 A1 | 1/2011 | Curole et al. | |
| 2012/0248035 A1 | 10/2012 | Coffin et al. | |

FOREIGN PATENT DOCUMENTS

| | | |
|---|---|---|
| WO | WO2007/138327 | * 12/2007 |
| WO | WO-2007138327 A1 | 12/2007 |
| WO | WO-2009012378 A1 | 1/2009 |
| WO | WO-2012024099 A1 | 2/2012 |

* cited by examiner

WATER TREATMENT IN AT LEAST ONE MEMBRANE FILTRATION UNIT FOR ENHANCED HYDROCARBON RECOVERY

CROSS-REFERENCE TO RELATED APPLICATIONS

This application is a National Phase Entry of International Application No. PCT/IB2011/054471, filed on Oct. 11, 2011, which claims priority to French Patent Application Serial No. 1058369, filed on Oct. 14, 2010, both of which are incorporated by reference herein.

FIELD

The present invention relates to a method for treating water within the scope of the production of hydrocarbons, and more particularly of enhanced oil recovery, as well as to an installation suitable for applying this method.

BACKGROUND

In the field of the production of hydrocarbons, after the operations for recovering hydrocarbons by means of the natural pressure of the underground formation containing hydrocarbons, a so-called "primary" recovery; then it is generally proceeded with so-called "secondary" recovery by injection of water. Within this context, it is generally necessary to treat two types of aqueous flows, i.e. water withdrawn from the environment and which is intended to be injected (at least initially) into the underground formation, and production water, which represents the aqueous fraction recovered in the production wells. This production water may be discarded into the environment or preferably re-used as injection water from the moment that it is obtained in a sufficient amount.

Both of these aqueous flows have relatively different characteristics as regards their content of various contaminants and notably of solid materials and hydrocarbons. Therefore, these aqueous flows are treated in a different way, causing multiplication of the pieces of equipment which is particularly undesirable in congested environments, notably at sea. Therefore there exists a real need of developing a method for treating water within the scope of enhanced oil recovery which is both efficient and simpler to be implemented, in particular, with a reduced number of pieces of equipment.

SUMMARY

The invention first relates to a method for treating water, comprising:
- withdrawing water from the environment;
- filtering the withdrawn water in a membrane filtration unit;
- extracting a production flow from an underground formation containing hydrocarbons;
- separating and collecting production water from the production flow;
- filtering the production flow in said membrane filtration unit;
- collecting a treated water flow from said membrane filtration unit.

According to an embodiment, the withdrawing of water is carried out in the sea, a river, a lake, an aquifer, and/or a waste water effluent. According to an embodiment, the method further comprises purification of the treated water flow in an additional membrane filtration unit, and collection of a treated and purified water flow from the additional membrane filtration unit.

According to an embodiment, the method comprises:
- pretreating the production water prior to filtration of the latter, said pretreatment preferably comprising one or more steps selected from gas/liquid separation, liquid/solid separation and water/hydrocarbons separation; and/or
- pretreating the withdrawn water prior to the filtration of the latter, said pretreatment preferably comprising one or more steps selected from preliminary filtration, deoxygenation, chlorination, desulfatation, biocidal treatment and an injection of anti-deposition or anti-corrosion compounds.

According to an embodiment, the method is applied offshore on a floating support or on the sea bed. According to an embodiment, the filtration unit is a tangential filtration unit.

According to an embodiment, the filtration in the filtration unit comprises:
- feeding with water at least one membrane filtration module,
- collecting a permeate and collecting a retentate at the outlet of the membrane filtration module;
- withdrawing solid materials and/or hydrocarbons contained in the retentate, in order to provide a treated retentate;
- recycling the treated retentate at the inlet of the membrane filtration module.

The invention also relates to an installation for water treatment, comprising:
- means for withdrawing water from the environment;
- a unit for extracting hydrocarbons contained in an underground formation;
- a membrane filtration unit;
- a line for admitting withdrawn water, stemming from the water withdrawing means and feeding the membrane filtration unit;
- a line for admitting production water, fed by the hydrocarbon extraction unit and feeding the membrane filtration unit; and
- a line for collecting treated water, stemming from the membrane filtration unit.

According to an embodiment, the membrane filtration unit is a tangential membrane filtration unit.

According to an embodiment, the installation comprises:
- at least one membrane filtration module;
- a line for admission of water connected at the inlet of the membrane filtration module;
- a line for collecting permeate connected at the outlet of the membrane filtration modules;
- means for collecting retentate connected at the outlet of the membrane filtration modules;
- liquid/solid separation means and/or water/hydrocarbon separation means fed by the retentate collecting means;
- a line for recycling treated retentate connected at the outlet of the liquid/solid separation means and/or water/hydrocarbons separation means and feeding the water admission line;
and the liquid/solid separation means and/or water/hydrocarbons separation means preferably comprise a hydrocyclone.

According to an embodiment, the membrane filtration unit comprises a plurality of membrane filtration trains, each membrane filtration train comprising a feeding pump and one or more circuits which each comprise one or more membrane filtration modules; and a distribution system fed by the line for admitting withdrawn water and the line for admitting production water and feeding the membrane filtration trains. According to an embodiment, the membrane filtration unit includes inorganic membrane filters, or organic membrane filters or hybrid membrane filters, preferably inorganic membrane filters are in ceramic based on $Al_2O_3$, $TiO_2$, $ZrO_2$, $SiO_2$, MgO, SiC or a mixture thereof and more preferably ceramic membrane filters based on SiC.

According to an embodiment, the installation comprises:
an additional membrane filtration unit, fed by the line for collecting treated water;
a line for collecting treated and purified water, connected at the outlet of the additional membrane filtration unit.

According to an embodiment, the installation comprises:
a pretreatment unit located on the production water admission line and preferably comprising one or more separation systems selected from gas/liquid separation, liquid/solid separation and water/hydrocarbon separation systems; and/or
a pretreatment unit located on the line for admitting withdrawn water, and preferably comprising one or more pieces of equipment selected from a preliminary filtration system, a deoxygenation system, a chlorination system, a desulfatation system, a biocidal treatment system and a system for injecting anti-deposition or anti-corrosion compounds.

According to an embodiment, the installation is positioned on a support either floating on the sea or on the sea bed.

The invention also relates to a method for producing hydrocarbons comprising:
water treatment according to the method described above;
optionally addition of one or more additives into the treated water;
injection of the treated and if necessary purified water into the underground formation;
recovery of a hydrocarbon flow from the production flow.

With the present invention, it is possible to overcome the drawbacks of the state of the art, more particularly it provides a method for treating water (and a corresponding installation) which is both efficient and simpler to be implemented than the methods used in the state of the art. In particular, the invention may be implemented with a reduced number of pieces of equipment and with a better rate of use of the equipment. This is accomplished by common treatment of the water withdrawn from the environment and of the production water, by using a same piece of equipment, i.e. a same membrane filtration unit.

According to certain particular embodiments, the invention also has one or preferably more of the advantageous features listed below.

The invention allows multipurpose treatment. By using a same piece of equipment, it is possible to either only treat water withdrawn from the environment (notably at the initial stage of the exploitation of the underground formation) or only treat production water (if the latter is collected in a sufficient amount after the initial stage for exploitation of the underground formation), or further simultaneously treat production water and water withdrawn from the environment (providing a contribution for injection).

With the invention, if this is desired, it is possible to obtain very good quality of the injection water, not only allowing injection into the underground formation in a fracture mode, but also possibly in a matrix mode. It also allows water to be discarded into the environment.

With the invention, it is possible to obtain a constant quality of water regardless of the changes in the feed, and notably changes in flow rate at the input.

Membrane filtration is simple to control. No gas is generated which is compatible with undersea use.

DETAILED DESCRIPTION

Figure 1:
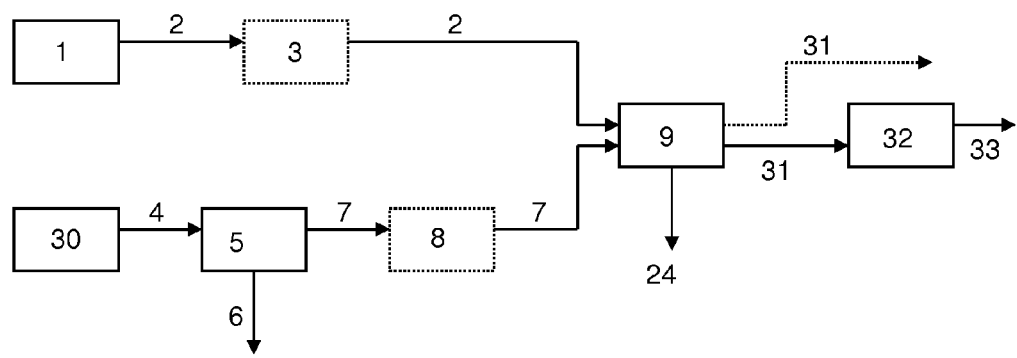
FIG. 1 schematically illustrates an embodiment of the installation according to the invention.

The invention is now described in more detail and in a non-limiting way in the following description. With reference to FIG. 1, the installation according to the invention comprises a single membrane filtration unit 9 fed or capable of being fed with two distinct flows of water, i.e. water withdrawn from the environment and production water, and this respectively by means of a line for admitting withdrawn water 2 and a line for admitting production water 7. Production water designates water which stems from a production flow, i.e. a flow from an underground formation containing hydrocarbons. More specifically, a hydrocarbon extraction unit 30, comprising one or more extraction wells located in the underground formation, provides a production flow in a production flow admission line 4.

The production flow is a mixture of hydrocarbons, water and possibly solid particles and/or gas. This production flow is separated into several fractions in a separation unit 5 fed by the production flow admission line 4. In particular, at least one hydrocarbon fraction is recovered in a hydrocarbon collecting line 6, and an aqueous fraction (production water) is drawn off in the production water admission line 7.

The production water may undergo a preliminary treatment before filtration in the membrane filtration unit 9, if this is necessary, taking into account the nature and the quality of the production water, and taking into account the desired specifications for the treated water. In this case, provision is made for a pre-treatment unit 8 on the production water admission line 7. This pre-treatment unit 8 may for example comprise one or more separation systems selected from gas/liquid separation, liquid/solid separation and water/hydrocarbons separation systems, which may notably comprise one or more hydrocyclones, or one or more gravity separation apparatuses.

The pre-treatment unit 8, when it is present, continues and refines the separation between water, hydrocarbons, solids and gases from the production flow which has been started in the separation unit 5. According to an embodiment, no pre-treatment of the production water is provided, on the contrary, the treatment of the production water being directly carried out in the membrane filtration unit 9 for more simplicity.

The water withdrawn from the environment is obtained by withdrawal means 1. The term of "environment" means not only the natural environment (water may for example be withdrawn from water streams or surface water expanses notably rivers, lakes and the sea, or further may be withdrawn from an underground water-bearing formation), but also non-natural sources of water, such as industrial or domestic effluents (waste water, sewage water and other waters). Generally the withdrawn water may stem from any source of water except for the underground formation containing the hydrocarbons. In other words it is distinct from the production water.

According to an embodiment, the invention is applied at sea, and water is withdrawn from the sea. The withdrawal means 1 may comprise extraction and pumping means.

The withdrawn water may undergo a preliminary treatment before filtration in the membrane filtration unit 9, if this is necessary, taking into account the nature and the quality of the withdrawn water, and taking into account the desired specifications for the treated water. In this case, a pre-treatment unit 3 is provided on the withdrawn water admission line 2. This pre-treatment unit 3 may for example comprise a preliminary filtration system; and/or a deoxygenation system; and/or a chlorination system; and/or a desulfatation system; and/or a biocidal treatment system; and/or a system for injecting anti-deposition/anti-corrosion compounds. Thus, the withdrawn water is pre-treated, and notably depending on the cases, filtered beforehand; and/or deoxygenated; and/or chlorinated; and/or desulfated; and/or treated with a biocidal agent; and/or added with anti-deposition or anti-corrosion compounds.

The relevant preliminary filtration is coarse filtration by means of one or more filters having a pore size greater than 5 μm and generally greater than 10 μm, greater than 100 μm or even greater than 1 mm. According to an embodiment, no pre-treatment of the production water is provided, on the contrary, the treatment of the production water being directly carried out in the membrane filtration unit 9 for more simplicity.

The production water and/or the withdrawn water are treated in the membrane filtration unit 9. The treated water is recovered in at least one line for collecting treated water 31, connected at the outlet of the membrane filtration unit 9, while a retentate is recovered in a retentate collecting line 24 and recycled if the membrane filtration is of the tangential type. The treated water recovered in the treated water collecting line 31 is preferably used in order to be injected into the underground formation, in one or more injection wells. It is possible to add one additive or additives to the treated water (for example surfactants or polymers intended to increase the viscosity of the water), in order to increase the efficiency of the flooding of the underground formation with the injected water.

Figure 2:
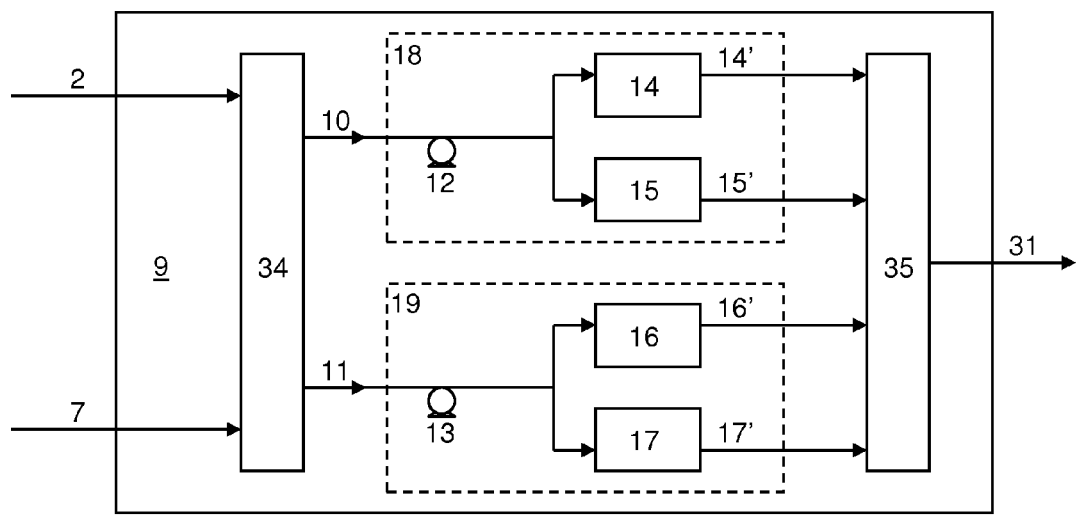
FIG. 2 schematically illustrates an embodiment of the membrane filtration unit used in the invention.

According to an embodiment, and with reference to FIG. 2 the membrane filtration unit 9 comprises at least one, and generally several membrane filtration trains 18, 19. Each membrane filtration train 18, 19 is fed with a respective train feeding line 10, 11, optionally provided with a respective feed pumping system 12, 13. Each membrane filtration train 18, 19 comprises at least one, and generally several circuits 14, 15, 16, 17. In the illustrated example, a first membrane filtration train 18 comprises two circuits 14, 15 which are both fed with a same train feeding line 10. Also, a second membrane filtration train 19 comprises two circuits 16, 17 which are both fed with a same train feeding line 11.

Figure 3:
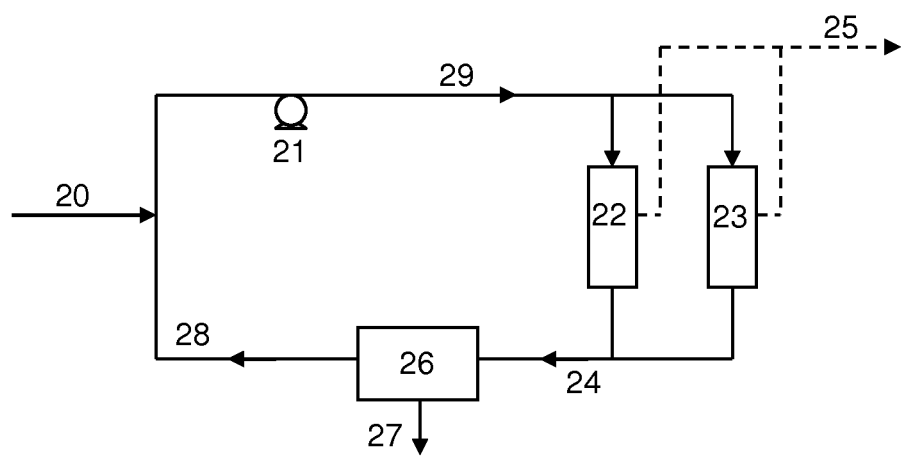
FIG. 3 schematically illustrates an embodiment of a circuit present in the membrane filtration unit used in the invention.

Each circuit 14, 15, 16, 17 comprises at least one and generally several membrane filtration modules. With reference to FIG. 3, the membrane filtration modules 22, 23 may be positioned in series and/or in parallel, in the circuit. By "membrane filtration unit", is meant an individual membrane filtration element, comprising a membrane filter. Each membrane filtration module provides a permeate (or filtrate) and a retentate. Returning to FIG. 2, individual lines for collecting treated water 14', 15', 16', 17' are connected at the outlet of the respective circuits 14, 15, 16, 17.

The membrane filtration unit 9 therefore has a modular structure and may operate in a multipurpose way both at the inlet and at the outlet. As regards the inlet, the membrane filtration unit 9 advantageously comprises a distribution system 34 to which are connected: at the input, the withdrawn water admission line 2, and the production water admission line 7; and at the outlet, the train feeding lines 10, 11. The distribution system 34 is adapted so as to separately feed each train feeding line 10, 11 either with withdrawn water, or with production water, or with a mixture of withdrawn water and of production water as selected by the operator. As regards the outlet, the membrane filtration unit 9 advantageously comprises a distribution system 35 to which are connected: at the inlet, individual lines for collecting treated water 14', 15', 16', 17'; and at the outlet line(s) for collecting treated water 31.

At the beginning of the exploitation of the underground formation, there is no available production water, and withdrawn water is only treated in the membrane filtration unit 9. Subsequently, when production water is available, it is advantageous to use this production water for injection. In this case, the production water is only treated in the membrane filtration unit 9 (withdrawing water from the environment is then stopped); or else production water and withdrawn water (ensuring a contribution) are both treated in the membrane filtration unit 9, and this either in separate membrane filtration modules or in the same membrane filtration modules (the production water and the withdrawn water may be mixed together).

Therefore, in the method of the invention, the filtration of the withdrawn water and the filtration of the production water in the membrane separation unit 9 may be carried out successively or simultaneously according to the exploitation periods. In the case of excess production water according to the needs as regards injection (and notably in the case of a reduction or interruption or stopping of the injection) it is possible to discard all or part of the treated water into the environment instead of injecting it into the underground formation.

The membrane filters present in the membrane filtration unit 9 may be organic membrane filters (in polymer) or inorganic membrane filters (in ceramic) or hybrid membrane filters, (partly in inorganic material and partly in polymer). The selection of the membrane filters is preferably carried out so that the latter may treat both the withdrawn water and production water, despite the different characteristics of these flows. Preferably, the membrane filters have to tolerate the presence of hydrocarbon compounds and notably aromatic compounds such as toluene and benzene, which may be present in the production water. Preferably, the membrane filters have to be able to withstand a temperature greater than or equal to 40° C., notably greater than or equal to 50° C., notably greater than or equal to 60° C., notably greater than or equal to 70° C., notably greater than or equal to 80° C., or even greater than or equal to 90° C., since the production of water may attain or exceed such temperature thresholds.

For the whole of these reasons, it is preferable to use ceramic membrane filters (which may notably withstand a hydrocarbon content ranging up to 1% or even 3% as well as a temperature above 100° C.), and notably membrane filters based on $Al_2O_3$, $TiO_2$, $ZrO_2$, $SiO_2$, MgO, SiC or a mixture thereof. The SiC-based membrane filters are particularly preferred because of their great hydrophilicity and resistance to abrasion: with them a higher permeate flow may be obtained and they are easier to clean. Certain organic membrane filters, notably those based on a material known as Teflon®, may also be suitable depending on the applications.

According to an embodiment, all the filtration trains, 18, 19 of the membrane filtration unit 9 are identical; and/or all the circuits 14, 15, 16, 17 of the filtration trains 18, 19 are identical; and/or all the membrane filtration modules 22, 23 and all the membrane filters are identical. Alternatively, the filtration trains 18, 19 of the membrane filtration unit 9 may be different. The membrane filtration unit 9 may be a frontal or tangential filtration unit. Frontal membrane filtration is more economical, while tangential membrane filtration gives the possibility of reducing the clogging of the filters and therefore reducing the frequency of the required maintenance (or increasing the lifetime of the unit).

The membrane filtration unit 9 is preferably a microfiltration or ultrafiltration unit, i.e. the membrane filters which it contains, has a pore size from 0.01 to 10 µm, and preferably from 0.01 to 1 µm. Thus, the membrane filtration unit 9 is adapted for suppressing the hydrocarbon drops as well as solid materials in suspension in the water. As an example, the water at the inlet of the membrane filtration unit 9 may contain up to 1,000 ppm of hydrocarbons and up to 200 mg/L of solid materials in suspension. The water treated at the outlet of the membrane filtration unit 9 may contain less than 10 ppm (preferably less than 5 ppm or even less than 1 ppm) of hydrocarbons and less than 10 mg/L (preferably less than 1 mg/L) of suspended solid materials: it is thus adapted to injection (including in a matrix mode) or to being discarded into the environment.

If it is desired to obtain an even higher water purity, and notably remove the dissolved salts, provision is made for an additional membrane filtration unit 32 fed by the line for collecting treated water 31. This additional membrane filtration 32 is preferably a reverse osmosis or nanofiltration unit (comprising membrane filters having a pore size of less than 0.01 µm). Treated and purified water is then recovered in a line for collecting treated and purified water 33 connected at the outlet of the additional membrane filtration unit 32.

Complementary treatment means may also be provided depending on the needs, for example a unit for deoxygenation of water between the membrane filtration unit 9 and the additional membrane filtration unit 32 (in this case, it is unnecessary to provide deoxygenation upstream from the membrane filtration unit 9). It may be advantageous to heat the water at the inlet of the membrane filtration unit 9, in order to reduce its viscosity and to reduce the risks of clogging of the membrane filters with the hydrocarbons. To do this, provision is made for a heat exchanger on the withdrawn water admission line 2 and/or on the production water admission line 7 and/or on the train feeding lines 10, 11. The heat exchanger may for example be coupled with the conduit(s) for collecting treated water 31 or else with the individual lines for collecting treated water 14', 15', 16', 17', in order to recover the calories of the treated water (which may typically be at a temperature from 30 to 90° C.).

The invention may be applied on land or at sea. The offshore application may be on a floating support or a platform, or further on the sea bed, while using suitable equipment (marinization of the equipment).

Alternative

In the case of tangential filtration, an alternative of the invention provides coupling of the membrane filtration with continuously purification of the retentate in the filtration loop or discontinuously purification when this is required for separation. More specifically, with reference to FIG. 3, a circuit of the membrane filtration unit 9 comprises a water admission line 29, on which is positioned a circulation pump 21. The water admission line 29 opens into one or more membrane filtration modules 22, 23. In the illustrated embodiment, to membrane filtration modules 22, 23 positioned in parallel are provided. At the outlet of the membrane filtration modules 22, 23 is connected a permeate collecting line 25. This permeate collecting line 25 corresponds to an individual line for collecting treated water, 14', 15', 16', 17' described above in connection with FIG. 2.

Retentate collecting means 24 are also connected at the outlet of the membrane filtration modules 22, 23. In the illustrated case, this is a retentate collecting line. The retentate collecting means 24 feed separation means 26, which may be liquid/solid separation means; or water/hydrocarbons separation means; or further liquid/solid separation means associated with water/hydrocarbons separation means.

The separation means 26 may comprise gravity separation means of decanter type or flotation separation means. But preferably, these are desanding and/or deoiling hydrocyclone(s) since these devices are relatively compact. It is further possible to use a rotary hydrocyclone, as the one described in the application no. FR 09/59254 as of Dec. 18, 2009.

At least one line for collecting contaminants 27 is connected at the outlet of the separation means 26; it allows recovery of the materials removed from the retentate (hydrocarbons and/or solid materials). A line for recycling treated retentate 28 is also connected at the outlet of the separation means 26; it allows the majority of the retentate to be recovered, having been cleared of part of its contaminants (hydrocarbons and/or solid materials). The line for recycling treated retentate 28 feeds the water admission line 29. A water feeding line 20 also opens into the water admission line 29. It does stems from a train feed line 10, 11, and ensures the feeding of the membrane filtration modules 22, 23 with withdrawn water and/or production water, which has to be treated.

With the present alternative, it is possible to limit the amount of contaminants (hydrocarbons and/or solid materials) in contact with the membrane filters, and therefore reduce the risks of clogging and increase the lifetime of the membrane filters, while allowing reduction in the amount of retentate to be treated. The power of the circulation pump 21 is adapted so as to take into account the presence of the separation means 26.

According to another embodiment (not illustrated), provision may be made for a separator (notably a hydrocyclone) directly coupled at the outlet of each membrane filtration module 22, 23. In this case the retentate collecting means 24 are simply connecting means between the membrane filtration modules 22, 23 and the respective separators, which ensures optimal compact integration of the different pieces of equipment.

Generally, the separation of the solid materials and/or of the hydrocarbon drops in the retentate is all the more efficient since the flow rate of the retentate is high and the concentration of solid materials and/or hydrocarbon drops is also high therein (in any case higher than in the flow feeding the membrane filtration unit): these are particularly favorable conditions for the separation means of the hydrocyclone type. Therefore there exists particularly efficient coupling between the filtration membranes and the separation means which are associated with them.

The invention claimed is:

1. A water treatment method, comprising:
   withdrawing water from the environment to provide withdrawn water;
   filtering withdrawn water in a membrane filtration unit, the membrane filtration unit having a plurality of membrane filtration trains provided with feed lines, and a distribution system adapted to separately feed each feed line of the membrane filtration trains, each membrane filtration train comprising at least one membrane filtration circuit and each membrane filtration circuit comprising at least two membrane filtration modules positioned in series and/or in parallel in the membrane filtration circuit, the membrane filtration module being an individual membrane filtration element comprising a membrane filter;
   extracting a production flow from an underground formation containing hydrocarbons;
   separating and collecting production water from the production flow;
   filtering the production water in the membrane filtration unit; and
   collecting a treated water flow from the membrane filtration unit;
   the method further comprising, in the circuit:
   (a) feeding the at least one membrane filtration module with at least one of the withdrawn water and the production water by passing at least one of the withdrawn water and the production water through a first line connected to an inlet of the at least one membrane filtration module;
   (b) collecting a permeate and collecting a retentate at an outlet of the at least one membrane filtration module;
   (c) withdrawing at least one of: solid materials and hydrocarbons contained in the retentate in order to provide a treated retentate; and
   (d) recycling the treated retentate at an inlet of the at least one membrane filtration module by passing the treated retentate through a second line that is in fluid communication with the first line;
   wherein the withdrawn water and the production water are sent to the distribution system prior to said steps of filtering the withdrawn water and filtering the production water in order to feed, at the choice of the operator, the membrane filtration unit with the withdrawn water or the production water or a mixture of the withdrawn water and the production water;
   wherein the withdrawn water is distinct from the production water and originates from any source of water except for the underground formation containing the hydrocarbons;
   wherein the filtration of the withdrawn water and the filtration of the production water in the membrane filtration unit is carried out successively or simultaneously;
   wherein the filtration unit is a tangential filtration unit; and
   wherein the membrane filter is a SiC-based membrane filter.

2. The method according to claim 1, wherein said step of withdrawing water from the environment is carried out in at least one of: a sea, a river, a lake, an aquifer and a waste water effluent.

3. The method according to claim 1, further comprising purification of the treated water flow in an additional membrane filtration unit, and collection of a treated and purified water flow from the additional membrane filtration unit.

4. The method according to claim 1, further comprising at least one of:
   (a) pre-treating the production water prior to the filtration of the production water, the pre-treatment comprising at least one of: gas/liquid separation, liquid/solid separation and water/hydrocarbons separation; and
   (b) pre-treating the withdrawn water prior to the filtration of the withdrawn water, the pre-treatment comprising at least one of: preliminary filtration, deoxygenation, chlorination, desulfatation, biocidal treatment and injection of anti-deposition or anti-corrosion compounds.

5. The method according to claim 1 further comprising locating the membrane filtration unit at sea on a floating support or on the sea bed.

6. A water treatment installation, comprising:
   a pump withdrawing water from the environment;
   a unit for extracting hydrocarbons contained in an underground formation;
   a membrane filtration unit comprising a plurality of membrane filtration trains, each membrane filtration train comprising a feeding pump and at least one membrane filtration circuit comprising at least one membrane filtration module, the at least one membrane filtration module having an individual membrane filtration element comprising a SiC-based membrane filter;
   a first line receiving the withdrawn water from the pump and feeding the withdrawn water to the membrane filtration unit;
   a second line receiving the production water from the unit for extracting hydrocarbons and feeding the production water to the membrane filtration unit;
   a third line collecting treated water from the membrane filtration unit; and
   a distribution system fed by the first line and the second line that is adapted to separately feed each of the membrane filtration trains with at least one of the withdrawn water and the production water, as selected by the operator;
   wherein the first line and the second line converge at the membrane filtration unit; and
   wherein the membrane filtration unit is a tangential membrane filtration unit.

7. The installation according to claim 6, further comprising:
   a fourth line connected to an inlet of the at least one membrane filtration module for supplying at least one of the withdrawn water and the production water to the at least one membrane filtration module;
   a fifth line connected to an outlet of the at least one membrane filtration module for collecting permeate from the at least one membrane filtration module;
   a collector connected to the outlet of the at least one membrane filtration module for collecting retentate from the at least one membrane filtration module;
   a separator fed by the collector that operably separates at least one of: (a) liquid/solid and water/hydrocarbon; and
   a sixth line connected to an outlet of the separator and the fourth line for recycling treated retentate and feeding the treated retentate back to the at least one membrane filtration module;
   wherein the separator further comprises a hydrocyclone.

8. The installation according to claim 6, further comprising:

an additional membrane filtration unit that is fed by the third line; and a seventh line connected to an outlet of the additional membrane filtration unit for collecting treated and purified water from the additional membrane filtration unit.

9. The installation according to claim 6, further comprising at least one of:
- a pre-treatment unit located on the second line and including one or more separation systems selected from gas/liquid separation systems, liquid/solid separation systems and water/hydrocarbons separation systems; and
- a pre-treatment unit located on the first line and including one or more pieces of equipment selected from a preliminary filtration system, a deoxygenation system, a chlorination system, a desulfatation system, a biocidal treatment system and a system for injecting anti-deposition or anti-corrosion compounds.

10. The installation according to claim 6, wherein the water treatment installation is positioned on a floating support at sea or on the sea bed.

11. A method for producing hydrocarbons comprising:
withdrawing water from the environment to provide withdrawn water;
extracting a production flow from an underground formation containing hydrocarbons;
separating and collecting production water from the production flow;
mixing the production water and the withdrawn water;
filtering the mixture of the withdrawn water and the production water in a single membrane filtration unit to produce a treated water flow;
collecting the treated water flow from the single membrane filtration unit;
adding at least one additive to the treated water flow;
injecting the treated water flow into the underground formation; and
recovering a flow of hydrocarbons from the production flow;
wherein the withdrawn water and the production flow come from different sources and the step of extracting the production flow is performed separately from the step of withdrawing water from the environment;
wherein the membrane filtration unit is a tangential membrane filtration unit and comprises a plurality of membrane filtration trains, each membrane filtration train comprising a feeding pump and at least one membrane filtration circuit comprising at least one membrane filtration module, the at least one membrane filtration module having an individual membrane filtration element comprising a SiC-based membrane filter;
the method further comprising, in the circuit:
(a) feeding the at least one membrane filtration module with at least one of the withdrawn water and the production water by passing at least one of the withdrawn water and the production water through a first line connected to an inlet of the at least one membrane filtration module;
(b) collecting a permeate and collecting a retentate at an outlet of the at least one membrane filtration module;
(c) withdrawing at least one of: solid materials and hydrocarbons contained in the retentate in order to provide a treated retentate; and
recycling the treated retentate at an inlet of the at least one membrane filtration module by passing the treated retentate through a second line that is in fluid communication with the first line.

12. A water treatment method according to claim 1, wherein at least one of the withdrawn water and the production water at an inlet of the membrane filtration unit contains hydrocarbons and solid materials in suspension, the amount of hydrocarbons being up to 1,000 ppm and the amount of solid materials in suspension being up to 200 mg/L and the treated water flow at an outlet of the membrane filtration unit contains less than 10 ppm of hydrocarbons and less than 10 mg/L of suspended solid materials.

* * * * *